United States Patent [19]

Ishii et al.

[11] Patent Number: 5,658,628

[45] Date of Patent: Aug. 19, 1997

[54] BLOW BOTTLES OF POLYOLEFIN RESIN

[75] Inventors: Hirohisa Ishii; Toshihiko Nishida; Kunio Gouda, all of Ichihara, Japan

[73] Assignee: CHISSO Corporation, Osaka, Japan

[21] Appl. No.: 544,283

[22] Filed: Oct. 17, 1995

Related U.S. Application Data

[63] Continuation of Ser. No. 147,434, Nov. 5, 1993, abandoned, which is a continuation of Ser. No. 843,215, Feb. 28, 1992, abandoned.

[30] Foreign Application Priority Data

Mar. 1, 1991 [JP] Japan ................. 3-059339

[51] Int. Cl.$^6$ ............................................. B29D 23/00
[52] U.S. Cl. ................. 428/36.92; 428/35.7; 428/516; 215/400
[58] Field of Search ......................... 428/36.92, 35.7, 428/516; 525/240; 526/348, 348.1, 351, 352; 215/1 C

[56] References Cited

U.S. PATENT DOCUMENTS

| | | | |
|---|---|---|---|
| 4,500,681 | 2/1985 | Shulman | 525/222 |
| 4,577,768 | 3/1986 | Go et al. | 215/1 C |
| 4,845,145 | 7/1989 | Hazelton et al. | 524/426 |
| 4,943,615 | 7/1990 | Yamawaki | 525/240 |
| 5,041,491 | 8/1991 | Turke et al. | 524/425 |

FOREIGN PATENT DOCUMENTS

| | | |
|---|---|---|
| 53-079939 | 7/1978 | Japan. |
| 60-127336 | 7/1985 | Japan. |
| 63-162740 | 7/1988 | Japan. |
| 2215848 | 8/1990 | Japan. |
| 314852 | 1/1991 | Japan. |

*Primary Examiner*—James J. Seidleck
*Assistant Examiner*—Michael A. Williamson
*Attorney, Agent, or Firm*—Leydig, Voit & Mayer

[57] ABSTRACT

The present invention provides blow bottles of a polyolefin resin having excellent transparency by the utilization of characteristics of the polypropylene. That is, they are the blow bottles of a polyolefin resin obtained by subjecting, to an extrusion blow molding method, a composition having a melt flow rate at 230° C. of 0.5 to 10 g/10 minutes prepared by blending (A) 70 to 99.99% by weight of a propylene random copolymer of multi-component system having a crystalline melting point of 110° to 145° C. and containing 3 to 10% by weight of ethylene units with (B) a certain amount of two or three kinds of polyethylenes selected from 15 to 0.01% by weight of a straight-chain low-density polyethylene, 4 to 0.01% by weight of a low-density polyethylene and 4 to 0.01% by weight of a high-density polyethylene.

22 Claims, No Drawings

BLOW BOTTLES OF POLYOLEFIN RESIN

This application is a continuation of patent application Ser. No. 08/147,434, filed Nov. 5, 1993, now abandoned, which is a continuation of application Ser. No. 07/843,215, filed Feb. 28, 1992, now abandoned.

BACKGROUND OF THE INVENTION (i) Field of the Invention

The present invention relates to blow bottles of a polyolefin resin. More specifically, it relates to blow bottles of a polyolefin resin which are extremely excellent in transparency and free from odor and which have good moldability.

(ii) Description of the Related Art

Polypropylene blow bottles are excellent in properties such as stiffness, impact resistance and chemical resistance, but on the contrary, they have drawbacks such as poor transparency and restriction on applications.

Japanese Patent Application Laid-open No. 60-124643 discloses a blend of a high-density polyethylene (HDPE) and a straight-chain or linear low-density polyethylene (LLDPE) and containers prepared therefrom, and Japanese Patent Application Laid-open No. 63-162740 discloses an olefin resin composition for injection blow molding which comprises a specific polypropylene and a polyethylene. Furthermore, for the purpose of improving transparency, Japanese Patent Application Laid-open No. 3-14852 discloses blow molded containers of a propylene polymer composition containing 3-methylbutene-1, and Japanese Patent Application Laid-open No. 60-127336 discloses blow molded transparent containers prepared from a polypropylene using a nucleating agent.

The employment of the nucleating agent leads to drawbacks such as high crystallization rate, narrow molding conditions and poor productivity. Most of the nucleating agents give off extremely unpleasant odor, and particularly in the fields of medicines and foods, the problem of odor is the largest fault. In consequence, the employment of the odorous nucleating agent cannot provide practical blow bottles.

In addition, for the purpose of improving the appearance of containers and injection blow moldability, a method for randomly copolymerizing propylene of the main component with ethylene is employed, but in this case, the transparency of the obtained containers unexpectedly begins to deteriorate from a certain point, as the proportion of ethylene to be copolymerized increases. Therefore, in the case of a crystalline ethylene-propylene random copolymer, the ethylene content for maintaining transparency is limited to the range of 7 to 10% by weight, which is not always sufficient to improve the blow molded containers to a satisfactory degree.

Moreover, also with regard to a composition containing 3-methylbutene-1 disclosed in Japanese Patent Application Laid-open No. 3-14852, the transparency cannot be improved to a satisfactory degree, and the tolerance range of molding conditions is limited and productivity is also poor. Particularly, in the case of molded articles such as blow or blown articles for which a cooling effect is poor, it is difficult to heighten the transparency.

SUMMARY OF THE INVENTION

The present inventors have repeatedly investigated with the intention of obtaining blow or blown bottles by which the above-mentioned conventional drawbacks can be solved and which has excellent transparency and characteristics of a polypropylene, and as a result, they have found that blow bottles produced from a composition prepared by blending a specific polypropylene with a specific polyethylene in a specific ratio can retain the extremely excellent transparency and the characteristics of the polypropylene. Thus, the present invention has been completed on the basis of this knowledge.

The polyolefin resin blow bottles of the present invention can be characterized by the following first paragraph to fourth paragraph:

1. Blow bottles of a polyolefin resin obtained by subjecting, to an extrusion blow molding method, a composition having a melt flow rate at 230° C. of 0.5 to 10 g/10 minutes and prepared by blending (A) 70 to 99.99% by weight of a propylene random copolymer of multi-component system having a crystalline melting point of 110° to 145° C. and containing 3 to 10% by weight of a ethylene units with (B) 15 to 0.01% by weight of a straight-chain low-density polyethylene.

2. The blow bottles of a polyolefin resin according to item 1 wherein the propylene random copolymer of the multi-component system is a copolymer obtained by copolymerizing a multi-component system comprising propylene as the main component, 3 to 10% by weight of ethylene and at least one of α-olefins having 4 or more carbon atoms.

3. Blow bottles of a polyolefin resin obtained by subjecting, to an extrusion blow molding method, a composition having a melt flow rate at 230° C. of 0.5 to 10 g/10 minutes prepared by blending (A) 80 to 99.99% by weight of a propylene random copolymer of multi-component system having a crystalline melting point of 110° to 145° C. and containing 3 to 10% by weight of ethylene units with (B) 4 to 0.01% by weight of a low-density or a high-density polyethylene.

4. The blow bottles of a polyolefin resin according to item 3 wherein the propylene random copolymer of multi-component system is a copolymer obtained by copolymerizing a multi-component system comprising propylene as the main component, 3 to 10% by weight of ethylene and at least one of α-olefins having 4 or more carbon atoms.

DESCRIPTION OF THE PREFERRED EMBODIMENTS

The propylene random copolymer of a multi-component system which can be used in the present invention is a propylene random copolymer of a multi-component system having a crystalline melting point (Tm) of 110° to 145° C. and containing 3 to 10% by weight of ethylene units, and the "multi-component system" means three or more components. The propylene random copolymer of a two-component system cannot provide blow bottles having good transparency. Here, the crystalline melting point (Tm) means the peak temperature of an endothermic curve which accompanies the melting of crystals and which is obtained by heating 10 mg of a sample at a rate of 20° C./minute in a nitrogen atmosphere by the use of a differential scanning calorimeter. The propylene random copolymer having a crystalline melting point Tm of more than 145° C. or less than 110° C. is not suitable for the preparation of the blow bottles of the present invention, because the transparency of the obtained bottles is poor. In general, the crystalline melting point Tm of the propylene random copolymer lowers, as the content of a comonomer component such as ethylene increases. For example, when the content of the ethylene component in the copolymer is in excess of 4% by weight, the crystalline melting point Tm is 140° C. or less, depending slightly upon the randomness of the copolymer.

This propylene random copolymer of multi-components system can be obtained by copolymerizing a three-component system comprising propylene as the main component, 3 to 10% by weight of ethylene and at least one α-olefin having 4 or more carbon atoms such as butene-1 and hexene-1. For example, the preparation of the propylene random copolymer of multi-component system can be effected by subjecting these components to solution polymerization or gaseous polymerization at a low temperature and at a high hydrogen concentration by the use of a Ziegler-Natta catalyst or a known reduction type or carrier type high-active catalyst.

A typical example of the propylene random copolymer of a multi-component system can be obtained by copolymerizing the three-component system comprising 3 to 10% by weight of ethylene, 3 to 6% by weight of butene-1 or hexene-1 and 94 to 84% by weight of propylene, and the thus obtained copolymer has a Tm of 120° to 135° C. Above all, the copolymer having a Tm of 120° to 135° C. and a melt flow rate (MFR) at 230° C. of 2 to 8 g/10 minutes is particularly preferable. The content of the ethylene units in the propylene random copolymer of multi-component system of the present invention can be measured by infrared analysis or NMR.

On the other hand, with regard to the crystalline melting point Tm of a propylene-ethylene block copolymer, the main peak is in excess of 150° C., and secondary small peaks are observed in the range of 110° to 130° C. Such a block copolymer having a Tm of more than 140° C. is not suitable for the purpose of the present invention, because the blow bottles obtained therefrom have very poor transparency.

A straight-chain low-density polyethylene which can be used in the preparation the blow bottles of the present invention is called a linear low-density polyethylene (LLDPE) by a person skilled in the art, and this polyethylene is an ethylene copolymer which can be prepared by copolymerizing ethylene as the main component and an α-olefin such as butene-1 or hexene-1 by the use of a Ziegler-Natta catalyst. Above all, the polyethylene having a density of 0.915 to 0.935 g/cm$^3$ and a MFR at 190° C. of 0.5 to 50 g/10 minutes is particularly preferable. The amount of the straight-chain low-density polyethylene to be blended is in the range of 0.01 to 15% by weight, preferably 0.05 to 10% by weight, more preferably 0.1 to 3% by weight of the total weight of the composition. When the amount of the polyethylene is less than 0.01% by weight, the improvement effect of the transparency is insufficient; and when it is in excess of 15% by weight, an opaque appearance attributable to the straight-chain low-density polyethylene increases. Therefore, such improper amounts of the straight-chain low-density polyethylene are not preferable for the preparation of the transparent bottles which are intended by the present invention.

A low-density polyethylene which can be used in the preparation of the blow bottles of the present invention is preferably a polyethylene having a density of 0.915 to 0.935 g/cm$^3$ which can be prepared by a high-pressure method. The particularly preferable polyethylene has a MFR at 190° C. of 0.5 to 30 g/10 minutes and a density of 0.915 to 0.925 g/cm$^3$. A high-density polyethylene which can be used in the preparation of the blow bottles of the present invention is a polyethylene which can be prepared under a medial or a low pressure by the use of the Ziegler-Natta catalyst or a known reduction type or carrier type high-active catalyst. The particularly preferable high-density polyethylene has a density of 0.945 to 0.970 g/cm$^3$ and a MFR at 190° C. of 0.5 to 30 minutes.

The amount of the low-density or the high-density polyethylene is in the range of 0.01 to 4% by weight, preferably 0.3 to 2% by weight of the total weight of the composition. When the amount of the polyethylene is less than 0.01% by weight, the improvement effect of the transparency is insufficient; when it is more than 4% by weight, an opaque appearance attributable to the low-density or the high-density polyethylene increases, and this fact is not preferable for the transparent bottles.

The composition for use in the blow bottles of the present invention can be formed by blending (A) the above-mentioned propylene random copolymer of a multi-component system with (B) the polyethylene selected from the group consisting of straight-chain low-density polyethylene, low-density polyethylene and high-density polyethylene. In the present invention, an isotactic polypropylene or a crystalline propylene-ethylene copolymer containing 4% by weight or less of ethylene can be used together, so long as it does not impair the purpose of the present invention. The above-mentioned polyethylene may be one selected from the group consisting of straight-chain low-density polyethylene, low-density polyethylene and high-density polyethylene, or it may be a blend of two or more kinds of polyethylenes, for example, three kinds of straight-chain low-density polyethylene, low-density polyethylene and high-density polyethylene. Needless to say, different kinds of propylene random copolymer of a multi-component system, polypropylene and polyethylene may be selected and mixed in compliance with the purpose of the present invention, so long as they do not impair the purpose.

The composition which can be used in the preparation of the blow bottles of the present invention may contain an antioxidant, a weathering agent, an ultraviolet light absorber, an antistatic agent, a colorant, an organic nucleating agent and an inorganic nucleating agent, for example, known various additives such as talc in addition to the above-mentioned components, so long as they do not impair the purpose of the present invention.

In order to mix the respective components of the composition which can be used in the preparation of the blow bottles of the present invention, there can be used, for example, a mixer equipped with a high-speed stirrer such as a tumbler, a Henschel mixer (trade name) or a supermixer (trade name), or a usual mixing machine such as a ribbon blender or a tumbler mixer. Furthermore, in the case that melting and kneading are required, a usual single-screw extruder or a twin-screw extruder can be used. A melting/kneading temperature is usually from 160° to 300° C., preferably from 230° to 270° C.

The blow bottles of the present invention can be obtained by utilizing an extrusion blow molding method. One example of this extrusion blow molding method comprises melt extruding a parison by the use of an extruder, feeding the parison into a mold for blow molding maintained at 50° C., blowing air having a pressure of 5 to 10 kg/cm$^2$ through an air blowing orifice, and then applying the air pressure until the shape of the parison has been fixed. The blow bottles obtained by this method are excellent in see through and impact resistance, and therefore they can be used in various applications regarding foods and medicines.

With regard to conventional blow bottles in which a nucleating agent is used, transparency is good but odor is very bad. In the blow bottles obtained from a propylene random copolymer of a two-component system of ethylene, the problem of the odor is solved but the improvement effect of the transparency is poor, and an HAZE value is more than 25, which indicates the transparency is not sufficient.

On the contrary, the polyolefin resin blow bottles obtained by the present invention have extremely excellent transparency, i.e., a transparency HAZE value of less than 20, occasionally an HAZE value of 7, and less odor, as compared with the conventional polypropylene blow bottles. In preparing the blow bottles of the present invention, the tolerance range of molding conditions is wide, and thus moldability and productivity are good. In consequence, the polyolefin resin blow bottles obtained by the present invention are very useful as bottles for medicines and foods where a clean state is desired.

The present invention is described below with reference to the following examples and comparative examples, but the scope of the present invention should not be construed as being limited to these examples. Incidentally, characteristics described in the examples and comparative examples were evaluated by the following procedures:

(1) A crystalline melting point (Tm) was measured at room temperature (23° C.) under a nitrogen atmosphere at a sample temperature rise rate of 20° C./minute by the use of a differential scanning calorimeter (abbreviated to "DSC"), and it was represented by a peak temperature (°C.) of an endothermic curve which accompanies the melting of crystals.

(2) A MFR at 230° C. (g/10 minutes) was measured under test conditions 14 (230° C., 2.16 Kgf) of JIS K7210 (1976).

(3) A MFR at 190° C. (g/10 minutes) was measured under test conditions 14 (190° C., 2.16 Kgf) of JIS K7210 (1976).

(4) Transparency (HAZE) was evaluated by taking a sample (thickness 0.6 mm) from the central portion of the trunk of a blow bottle, and then measuring a HAZE value (%) in accordance with ASTM D1003. The smaller this value is, the better the transparency is.

(5) Density (g/cm$^3$) was measured in accordance with the D method (a density gradient tube method) of test conditions of JIS K7112 (1980).

(6) With regard to odor, 10 blow bottles simultaneously molded were smelled by 10 testers, and the evaluation of the odor was made as follows: The bottles which were recognized to have no odor or extremely faint and to have no unpleasant feeling by all of the testers were represented by 0, and the bottles which were recognized to be unpleasant by 6 or more testers were represented by X.

(7) Glossiness (%) was measured in accordance with test conditions (mirror surface at 60° C.) of JIS K7105 (1981).

EXAMPLE 1

99.5 parts by weight of a crystalline propylene random copolymer of a three-component system (5.0% by weight of ethylene, 4.5% by weight of butene-1 and 90.5% by weight of propylene) having a Tm of 125° C. and a MFR at 230° C. of 4.3 g/10 minutes were mixed with 0.1 part by weight of a straight-chain low-density polyethylene having a MFR at 190° C. of 8.0 g/10 minutes and a density of 0.920 g/cm$^2$, 0.1 part by weight of 2,6-di-t-butyl-p-cresol as an antioxidant, and 0.1 part by weight of calcium stearate. Next, the mixture was blended by the use of a Henschel mixer, and then melted, kneaded and extruded by an extruder to obtain a composition in the form of pellets whose MFR at 230° C. was 4.6 g/10 minutes.

This composition was then molded at an extrusion temperature of 170° to 210° C. at a mold temperature of 30° C. by the use of an extrusion blow molding machine (Placo S-50NA) to obtain a 500-ml blow bottle having a trunk average thickness of 0.6 mm. Characteristics of this blow bottle are set forth in Table 1.

EXAMPLES 2 TO 6

The same procedure as in Example 1 was effected except that the amounts of crystalline propylene random copolymer and straight-chain low-density polyethylene were changed. The amounts of the materials and the MFR at 230° C. of the respective compositions and characteristics of the blow bottles are set forth in Table 1.

EXAMPLES 7 TO 9

The same procedure as in Example 3 was effected except that another kind of straight-chain low-density polyethylene was used. Details are set forth in Table 1.

COMPARATIVE EXAMPLE 1

The same procedure as in Example 1 was effected except that straight-chain low-density polyethylene was not used. Details are set forth in Table 1.

COMPARATIVE EXAMPLE 2

The same procedure as in Example 1 was effected except that straight-chain low-density polyethylene was not used and 0.2 part by weight of dibenzylidenesorbitol which is a nucleating agent was additionally blended. Details are set forth in Table 1.

COMPARATIVE EXAMPLE 3

The same procedure as in Example 1 was effected except that 20 parts by weight of a straight-chain low-density polyethylene were used. Details are set forth in Table 1.

The results in Table 1 indicate that transparent blow bottles obtained in Examples 1 to 9 regarding the present invention had higher transparency as compared with those of Comparative Example 1.

In the injection molded articles obtained in Comparative Example 2, 0.2% by weight of dibenzylidenesorbitol which was a nucleating agent was added for the purpose of getting excellent transparency, but these articles had a peculiar odor and were found to have an unpleasant feeling. The applications of these blow bottles are noticeably restricted, which is not preferable.

Furthermore, in the blow bottle obtained in Comparative Example 3, a large amount of the straight-chain low-density polyethylene is used, and therefore the opaque appearance attributable to the polyethylene increases and the HAZE value is high. In consequence, this product is undesirable as a transparent blow bottle.

TABLE 1

| | Composition (pts. wt.) | | | | | | | Performance of Blow Bottle | | |
|---|---|---|---|---|---|---|---|---|---|---|
| | Propylene Three-Component Copolymer | straight-chain Low-density Polyethylene | | | | Nucleating Agent | MFR at 230° C. | HAZE | Gloss | |
| | (PP-A) | LL-1 | LL-2 | LL-3 | LL-4 | (*1) | g/10 min. | % | % | Odor |
| Example 1 | 99.9 | 0.1 | 0 | 0 | 0 | 0 | 4.6 | 15 | 88 | ○ |
| Example 2 | 99.5 | 0.5 | 0 | 0 | 0 | 0 | 4.6 | 9 | 97 | ○ |
| Example 3 | 99.0 | 1.0 | 0 | 0 | 0 | 0 | 4.9 | 7 | 101 | ○ |
| Example 4 | 97.0 | 3.0 | 0 | 0 | 0 | 0 | 5.1 | 11 | 98 | ○ |
| Example 5 | 95.0 | 5.0 | 0 | 0 | 0 | 0 | 5.4 | 12 | 90 | ○ |
| Example 6 | 90.0 | 10.0 | 0 | 0 | 0 | 0 | 5.7 | 15 | 78 | ○ |
| Example 7 | 99.0 | 0 | 1.0 | 0 | 0 | 0 | 4.6 | 8 | 100 | ○ |
| Example 8 | 99.0 | 0 | 0 | 1.0 | 0 | 0 | 4.6 | 7 | 101 | ○ |
| Example 9 | 99.0 | 0 | 0 | 0 | 1.0 | 0 | 4.7 | 12 | 85 | ○ |
| Comp. Ex. 1 | 100 | 0 | 0 | 0 | 0 | 0 | 4.5 | 31 | 85 | ○ |
| Comp. Ex. 2 | 100 | 0 | 0 | 0 | 0 | 0.2 | 6.0 | 7 | 98 | X |
| Comp. Ex. 3 | 80.0 | 20.0 | 0 | 0 | 0 | 0 | 4.7 | 25 | 66 | ○ |

PP-A: A propylene random copolymer of three-component system comprising 5.0 wt % by ethylene, 4.5 wt % of butene-1 and 90.5 wt % propylene.
LL-1: MFR at 190° C. = 8.0, and density = 0.920
LL-2: MFR at 190° C. = 0.7, and density = 0.919
LL-3: MFR at 190° C. = 30.0, and density = 0.920
LL-4: MFR at 190° C. = 2.0, and density = 0.935
(*1): The nucleating agent was dibenzylidenesorbitol.

EXAMPLE 10

99.5 parts by weight of a a crystalline propylene random copolymer of three-component system (containing 3.7% by weight of an ethylene component, 4.5% by weight of a butene-1 component and 91.8% by weight of propylene) having a Tm of 132° C. and a MFR at 230° C. of 6.4 g/10 minutes were mixed with 0.5 part by weight of a straight-chain low-density polyethylene having a MFR at 190° C. of 8.0 g/10 minutes and a density of 0.920 g/cm$^3$, 0.1 part by weight of BHT, and 0.1 part by weight of calcium stearate. Next, the mixture was blended by the use of a Henschel mixer, and then melted and kneaded by an extruder, followed by cooling with water and cutting, thereby obtaining a composition in the form of pellets whose MFR at 230° C. was 6.5 g/10 minutes.

This composition which was a raw material was then molded at an extrusion temperature of 180° C. at a mold temperature of 40° C. by the use of an extrusion blow molding machine (Placo S-50NA) to obtain a 500-ml blow bottle having a trunk average thickness of 0.6 mm. Characteristics of the thus obtained blow bottle are set forth in Table 2.

EXAMPLES 11 TO 12

The same procedure as in Example 10 was effected except that amounts of the crystalline propylene random copolymer of a three-component system and the straight-chain low-density polyethylene were changed. Details are set forth in Table 2.

COMPARATIVE EXAMPLE 4

The same procedure as in Example 10 was effected except that 100 parts by weight of the crystalline propylene random copolymer of a three-component system were used and any-straight-chain low-density polyethylene was not used. Details are set forth in Table 2.

COMPARATIVE EXAMPLES 5 TO 8

The same procedure as in Comparative Example 4 and Examples 10 to 12 was effected except that the crystalline propylene random copolymer of a three-component system was replaced with a crystalline random copolymer of a two-component system (containing 6.7% by weight of an ethylene component and 93.3% by weight of propylene). Details are set forth in Table 2.

As is apparent from the results in Table 2, the blow bottles obtained in Examples 10 to 12 regarding the present invention have remarkably improved transparency as compared with the blow bottle obtained in Comparative Example 4 in which no straight-chain low-density polyethylene is used.

Additionally, in Examples 10 to 12, the release properties of the bottles from molds at the time of molding are good, and the gloss of the blow bottles is also excellent.

On the other hand, in blow bottles obtained from the crystalline propylene-ethylene random copolymer of two-component system (Comparative Example 5) and the copolymer additionally containing the straight-chain low-density polyethylene (Comparative Examples 6 to 8) which are outside the claims of the present invention, the improvement effect of the transparency is poor and HAZE values are in excess of 25. Therefore, these blow bottles of the comparative examples are not suitable for the purpose of the present invention.

TABLE 2

| | Composition (pts. wt.) | | | | Performance of Blow Bottle | | |
|---|---|---|---|---|---|---|---|
| | Propylene Three-Component Copolymer (PP-B) | Propylene Two-Component Copolymer (PP-C) | Polyethylene Low-density (LL-1) | MFR at 230° C. g/10 min. | HAZE % | Gloss % | Odor |
| Example 10 | 99.5 | 0 | 0.5 | 6.5 | 13.5 | 100 | ○ |
| Example 11 | 99.0 | 0 | 1.0 | 6.5 | 12.4 | 102 | ○ |
| Example 12 | 95.0 | 0 | 5.0 | 6.7 | 13.2 | 98 | ○ |
| Comp. Ex. 4 | 100.0 | 0 | 0 | 6.5 | 45 | 83 | ○ |
| Comp. Ex. 5 | 0 | 100.0 | 0 | 4.5 | 32 | 85 | ○ |
| Comp. Ex. 6 | 0 | 99.5 | 0.5 | 4.5 | 28 | 87 | ○ |
| Comp. Ex. 7 | 0 | 99.0 | 1.0 | 4.5 | 25 | 88 | ○ |
| Comp. Ex. 8 | 0 | 95.0 | 5.0 | 4.7 | 27 | 87 | ○ |

PP-B: A propylene random copolymer of three-component system comprising 3.7 wt % of ethylene, 4.5 wt % of butene-1 and 91.8 wt % of propylene.
PP-C: A propylene random copolymer of two-component system comprising 6.7 wt % of ethylene and 93.3 wt % of propylene.
LL-1: It is as defined in Table 1.

EXAMPLES 13 TO 15, COMP. EXAMPLE 9

A crystalline propylene random copolymer of a three-component system (containing 5.0% by weight of an ethylene component, 4.5% by weight of a butene-1 component and 90.5% by weight of propylene) having a Tm of 125° C. and a MFR at 230° C. of 4.3 g/10 minutes was mixed with a high-density polyethylene having a MFR at 190° C. of 4.3 g/10 minutes and a density of 0.950 g/cm$^3$ in ratios shown in Table 3. Next, the subsequent procedure was carried out in the same manner as in Example 1 to obtain compositions in the form of pellets.

500-ml blow bottles were molded from these compositions in the same manner as in Example 1. The results are set forth in Table 3.

EXAMPLES 16 TO 18, COMP. EXAMPLE 10

The same procedure as in Example 13 was effected except that a high-density polyethylene was added to a branched low-density polyethylene having a MFR at 190° C. of 2.0 g/10 minutes and a density of 0.922 g/cm$^3$.

As a result, it is apparent that when 0.1 to 3.0% by weight of the high-density polyethylene is used as shown in Examples 13 to 15, HAZE values are 20% or less, and the blow bottles obtained in these examples have clearly improved transparency, as compared with the blow bottles obtained in Comparative Example 1 (the HAZE value 31%) in which the high-density polyethylene is not blended.

In addition, when the amount of the high-density polyethylene is in excess of 4% by weight (Comparative Example 9), an opaque feeling inherent in the high-density polyethylene is seen, and such a composition as in Comparative Example 9 is not suitable for the preparation of the blow bottles having the excellent transparency according to the present invention.

Similarly, in Examples 16 to 18 in which the branched low-density polyethylene is blended, the amount of the branched low-density polyethylene is from 0.1 to 3% by weight, and thus HAZE values are 20% or less and the blow bottles having the high transparency can be obtained. In Comparative Example 10, the amount of the branched low-density polyethylene is 5% by weight, and thus an opaque state is noticeable. Therefore, the composition of Comparative Example 10 is not suitable for the preparation of the transparent blow bottles.

TABLE 3

| | Composition (pts. wt.) | | | | Performance of Blow Bottle | | |
|---|---|---|---|---|---|---|---|
| | Propylene Three-Component Copolymer (PP-A) | (PP-D) | Polyethylene High-density (PE-1) | Low-density (PE-2) | MFR at 230° C. g/10 min. | HAZE % | Gloss % | Odor |
| Example 13 | 99.9 | 0 | 0.1 | 0 | 4.6 | 18.5 | 82 | ○ |
| Example 14 | 99.0 | 0 | 1.0 | 0 | 4.6 | 13.0 | 93 | ○ |
| Example 15 | 97.0 | 0 | 3.0 | 0 | 4.8 | 16.2 | 83 | ○ |
| Example 16 | 99.9 | 0 | 0 | 0.1 | 4.6 | 16.5 | 96 | ○ |
| Example 17 | 99.0 | 0 | 0 | 1.0 | 4.6 | 13.1 | 86 | ○ |
| Example 18 | 97.0 | 0 | 0 | 3.0 | 4.8 | 18.0 | 79 | ○ |
| Comp. Ex. 9 | 95.0 | 0 | 5.0 | 0 | 4.6 | 21.3 | 76 | ○ |
| Comp. Ex. 10 | 95.0 | 0 | 0 | 5.0 | 4.7 | 30.2 | 61 | ○ |
| Comp. Ex. 11 | 0 | 100 | 0 | 0 | 0 | 21.7 | 88 | ○ |

TABLE 3-continued

| | Composition (pts., wt.) | | | | Performance of Blow Bottle | | |
|---|---|---|---|---|---|---|---|
| | Propylene Three-Component Copolymer | Polyethylene | | MFR at 230° C. g/10 min. | HAZE % | Gloss % | Odor |
| | | High-density | Low-density | | | | |
| | (PP-A) | (PP-D) | (PE-1) | (PE-2) | | | |

PP-A: As as defined in Table 1.
PP-D: A propylene three component copolymer having a MFR at 230° C. of 3.8 and a Tm of 132° C. and comprising 8.5 wt % of ethylene, 10.01 wt % of methylbutene-1 and 91.49 wt % of propylene.
PE-1: MFR at 190° C. = 4.3, and density = 0.950
PE-2: MFR at 190° C. = 2.0, and density = 0.922

EXAMPLES 19 TO 27

Compositions were obtained in blend ratios shown in Table 4 by the same procedure as in Example 1. These compositions were molded in the same manner as in Example 1 to obtain 500-ml blow bottles. The results are set forth in Table 4.

As is apparent from the results in this table, when the combination of a low-density polyethylene and a high-density polyethylene, or the combination of a high-density polyethylene and a straight-chain low-density polyethylene is used, blow bottles having extremely excellent transparency can be obtained. Thus, such a combination of the polyethylenes is suitable for the preparation of the transparent blow bottles.

2. The blow-molded bottles of claim 1 wherein said blow-molded bottle has a haze of less than 25 at a resin thickness of 0.6 mm.

3. The blow-molded bottles of a polyolefin resin according to claim 1 wherein the polyethylene component (B) has a density of 0.91 to 0.935 g/cm$^3$.

4. The blow-molded bottles of a polyolefin resin according to claim 1 wherein the propylene random copolymer of a multi-component system has an ethylene content of at least about 4% by weight, and a crystalline melting point of no more than 140° C.

5. The blow-molded bottles according to claim 1 wherein said polyethylene is composed mainly of ethylene units.

6. The blow-molded bottle according to claim 1 wherein Component (A) also includes an isotactic polypropylene or

TABLE 4

| | Composition (pts. wt.) | | | | | | MFR at 230° C. g/10 min. | Performance of Blow Bottle | | |
|---|---|---|---|---|---|---|---|---|---|---|
| | Polypropylene | | | Polyethylene | | | | HAZE % | Gloss % | Odor |
| | PP-A | PP-E | PP-F | LL-1 | PE-1 | PE-2 | | | | |
| Example 19 | 80 | 19 | | 1.0 | | | 5.3 | 15 | 97 | ◯ |
| Example 20 | 80 | | 19 | 1.0 | | | 4.9 | 13 | 96 | ◯ |
| Example 21 | 99 | | | 0.5 | | 0.5 | 4.8 | 10 | 94 | ◯ |
| Example 22 | 99 | | | | 0.5 | 0.5 | 4.6 | 13.2 | 90 | ◯ |
| Example 23 | 99 | | | 0.5 | 0.5 | | 4.6 | 10 | 97 | ◯ |
| Example 24 | 98.5 | | | 0.5 | 0.5 | 0.5 | 4.6 | 11 | 95 | ◯ |
| Example 25 | 97 | | | 1.0 | 1.0 | 1.0 | 4.7 | 13 | 93 | ◯ |
| Example 26 | 87 | | | 10.0 | 1.5 | 1.5 | 4.8 | 15 | 81 | ◯ |
| Example 27 | 94 | | | 5.0 | 0.5 | 0.5 | 4.7 | 14 | 89 | ◯ |

PP-A: As as defined in Table 1.
PP-E: An isotactic polypropylene having a MFR at 230° C. of 9.5 and a Tm of 164° C.
PP-F: A propylene random copolymer having a MFR at 230° C. of 7.5 and a Tm of 147° C. and comprising 2.5 wt % of ethylene and 97.5 wt % of propylene.
LL-1: A straight-chain low-density polyethylene having MFR at 190° C. of 8.0 and a density of 0.920.
PE-1: A high-density polyethylene having a MFR at 190° C. of 4.3 and a density of 0.950.
PE-2: A low-density polyethylene having a MFR at 190° C. of 2.0 and a density of 0.922.

What is claimed is:

1. An odor-free, blow-molded bottle of a polyolefin resin comprising a composition having a melt flow rate at 230° C. of 0.5 to 10 g/10 minutes containing (A) 70 to 99.99% by weight of a propylene random copolymer of a multi-component system having at least three components, a crystalline melting point of 110° to 145° C. and a melt flow rate at 230° C. of 2 to 8 g/10 minutes, containing 3 to 10% by weight of ethylene units and at least one α-olefin unit having at least 4 carbon atoms and (B) 10 to 0.05% by weight of a straight-chain low-density polyethylene.

a crystalline propylene-ethylene copolymer containing no more than 4%, by weight, of ethylene and a crystalline melting point of no more than 140° C.

7. An odor-free, transparent blow-molded bottle of a polyolefin resin comprising a composition having a melt flow rate at 230° C. of 0.5 to 10 g/10 minutes containing (A) 80 to 99.99% by weight of a propylene random copolymer of a multi-component system having at least three components, a crystalline melting point of 110° to 145° C. and a melt flow rate at 230° C. of 2 to 8 g/10 minutes, containing 3 to 10% by weight of ethylene units and at least one α-olefin unit having at least 4 carbon atoms and (B) 4 to 0.01% by weight of a low-density or a high-density polyethylene.

8. The blow-molded bottles of claim 7 wherein said blow-molded bottle has a haze value of less than 25 at a resin thickness of 0.6 mm.

9. The blow-molded bottles according to claim 7 wherein said polyethylene is composed mainly of ethylene units.

10. The blow-molded bottle according to claim 3 wherein Component (A) also includes an isotactic polypropylene or a crystalline propylene-ethylene copolymer containing no more than 4%, by weight, of ethylene and a crystalline melting point of no more than 140° C.

11. An odor-free, blow-molded bottle of a polyolefin resin comprising a composition having a melt flow rate at 230° C. of 0.5 to 10 g/10 minutes containing (A) 70 to 99.99% by weight of a propylene random copolymer of a multi-component system having at least three components, a crystalline melting point of 110° to 145° C. and a melt flow rate at 230° C. of 2 to 8 g/10 minutes, containing 3 to 10% by weight of ethylene units and at least one α-olefin unit having at least 4 carbon atoms and (B) an amount of two or three kinds of polyethylene units selected from the group consisting of 10 to 0.05% by weight of a straight-chain low-density polyethylene, 4 to 0.01% by weight of a low-density polyethylene and 4 to 0.01% by weight of a high-density polyethylene.

12. The blow-molded bottles of claim 11 wherein said blow-molded bottle has a haze value of less than 25 at a resin thickness of 0.6 mm.

13. The blow-molded bottles of a polyolefin resin according to claim 11 wherein the polyethylene component (B) has a density of 0.91 to 0.935 g/cm³.

14. The blow-molded bottles according to claim 11 wherein said polyethylene is composed mainly of ethylene units.

15. The blow-molded bottle according to claim 11 wherein Component (A) also includes an isotactic polypropylene or a crystalline propylene-ethylene copolymer containing no more than 4%, by weight, of ethylene and a crystalline melting point of no more than about 140° C.

16. An odor-free, transparent blow-molded bottle formed from a polyolefin resin comprising a composition having a melt flow rate at 230° C. of 0.5 to 10 g/10 minutes including (A) 70 to 99.99% by weight of a propylene random copolymer of a multi-component system having at least three components, a crystalline melting point of 110° to 145° C. and a melt flow rate at 230° C. of 2 to 8 g/10 minutes, containing 3 to 10% by weight of ethylene units and the third component which is at least one α-olefin unit having at least 4 carbon atoms and (B) 10 to 0.05% by weight of a straight-chain low-density polyethylene.

17. The blow-molded bottles according to claim 16 wherein said polyethylene is composed mainly of ethylene units.

18. An odor-free, transparent blow-molded bottle formed from a polyolefin resin comprising a composition having a melt flow rate at 230° C. of 0.5 to 10 g/10 minutes including (A) 70 to 99.99% by weight of a propylene random copolymer of a multi-component system comprising, by weight, 94 to 84% propylene, 3 to 10% ethylene, and 3 to 6% butene-1 or hexene-1 and having a crystalline melting point of 120° to 135° C. and melt flow rate at 230° C. of 2 to 8 g/10 minutes and containing 3 to 10% by weight of ethylene units and (B) 10 to 0.05% by weight of a straight-chain low-density polyethylene having a density of 0.915 to 0.935 g/cm³ and a melt flow rate at 190° C. of 0.5 to 50 g/10 minutes.

19. The blow-molded bottles according to claim 18 wherein said polyethylene is composed mainly of ethylene units.

20. An odor-free, transparent blow-molded bottle of a polyolefin resin comprising a composition having a melt flow rate at 230° C. of 0.5 to 10 g/10 minutes including (A) 90 to 99.5% by weight of a propylene random copolymer of a multi-component system comprising, by weight, 94 to 84% propylene, 3 to 10% ethylene, and 3 to 6% butene-1 or hexene-1 and having a melt flow rate at 230° C. of 2 to 8 g/10 minutes and a crystalline melting point of 120° to 135° C., and (B) 10 to 0.1 by weight of a straight-chain low-density polyethylene composed mainly of ethylene units, having a density of 0.915 to 0.935 g/cm³ and a melt flow rate at 190° C. of 0.5 to 50 g/10 minutes.

21. An odor-free, transparent blow-molded bottle of a polyolefin resin comprising a composition having a melt flow rate at 230° C. of 0.5 to 10 g/10 minutes including (A) 97 to 99.99% by weight of a propylene random copolymer of a multi-component system comprising, by weight 94 to 84% propylene, 3 to 10% ethylene, and 3 to 6% butene-1 or hexene-1 and having a melt flow rate at 230° C. of 2 to 8 g/10 minutes and a crystalline melting point of 120° to 135° C., and (B) 3.0 to 0.1% by weight of a high-density polyethylene having a density of 0.945 to 0.970 g/cm³ and a melt flow rate at 190° C. of 0.5 to 30 g/10 minutes.

22. An odor-free, transparent blow-molded bottle of a polyolefin resin comprising a composition having a melt flow rate at 230° C. of 0.5 to 10 g/10 minutes including (A) 87 to 98.5% by weight of a propylene random copolymer of a multi-component system comprising, by weight, 94 to 84% propylene, 3 to 10% ethylene, and 3 to 6% butene-1 or hexene-1 and having a melt flow rate at 230° C. of 2 to 8 g/10 minutes and a crystalline melting point of 120° to 135° C., and (B) 10 to 0.5% by weight of a straight-chain low-density polyethylene composed mainly of ethylene units, having a density of 0.915 to 0.935 g/cm³ and a melt flow rate at 190° C. of 0.5 to 50 g/10 minutes, and 0.5 to 1.5% by weight of a low-density polyethylene having a density of 0.915 to 0.925 g/cm³ and a melt flow rate at 190° C. of 0.5 to 30 g/10 minutes, and 0.5 to 1.5% by weight of a high-density polyethylene having a density of 0.945 to 0.970 g/cm³ and a melt flow rate at 190° C. of 0.5 to 30 g/10 minutes.

* * * * *

UNITED STATES PATENT AND TRADEMARK OFFICE
CERTIFICATE OF CORRECTION

PATENT NO.    : 5,658,628
DATED         : August 19, 1997
INVENTOR(S)   : Ishii et al.

It is certified that error appears in the above-indentified patent and that said Letters Patent is hereby corrected as shown below:

Column 14, Line 8, change "10w-" to --low--.

Signed and Sealed this

Thirtieth Day of December, 1997

*Attest:*

BRUCE LEHMAN

*Attesting Officer*   *Commissioner of Patents and Trademarks*